United States Patent [19]

Kasahara et al.

[11] Patent Number: 4,543,392

[45] Date of Patent: Sep. 24, 1985

[54] POLYMERIC MATERIALS AND NOVEL THERMOPLASTIC RESIN COMPOSITIONS

[75] Inventors: Hideo Kasahara, Yokohama; Hiroshi Suzuki, Tokyo; Noriaki Umeda, Yokosuka, all of Japan

[73] Assignee: Asahi-Dow Limited, Tokyo, Japan

[21] Appl. No.: 499,021

[22] Filed: May 26, 1983

Related U.S. Application Data

[63] Continuation of Ser. No. 302,670, Sep. 15, 1981, abandoned.

[30] Foreign Application Priority Data

Sep. 25, 1980 [JP] Japan ............................ 55-132295
Feb. 27, 1981 [JP] Japan ............................ 56-26880

[51] Int. Cl.$^4$ .................. C08G 81/02; C08G 41/04
[52] U.S. Cl. ............................. 525/90; 525/182; 525/183; 525/438
[58] Field of Search ................ 525/90, 182, 183, 438

[56] References Cited

U.S. PATENT DOCUMENTS

| | | | |
|---|---|---|---|
| Re. 30,322 | 7/1980 | Hammer | 525/183 |
| 2,524,045 | 10/1950 | Flory | 525/183 |
| 3,136,738 | 6/1964 | Hedrick | 525/183 |
| 3,261,885 | 7/1966 | Craubner | 525/183 |
| 3,388,186 | 6/1968 | Kray | 525/69 |
| 3,539,664 | 11/1970 | Kray | 525/182 |
| 3,644,571 | 2/1972 | Anderson | 525/183 |
| 3,963,799 | 6/1976 | Starkweather | 525/183 |
| 3,966,839 | 6/1976 | Sims | 525/183 |
| 3,972,961 | 8/1976 | Hammer | 525/183 |
| 3,976,720 | 8/1976 | Hammer | 525/183 |
| 4,100,223 | 7/1978 | Meyer . | |
| 4,225,476 | 9/1980 | Hammer | 525/182 |
| 4,421,892 | 12/1983 | Kasahara et al. | 525/183 |

FOREIGN PATENT DOCUMENTS 1440030  6/1976  United Kingdom .

*Primary Examiner*—Wilbert J. Briggs, Sr.
*Assistant Examiner*—A. L. Carrillo
*Attorney, Agent, or Firm*—Armstrong, Nikaido, Marmelstein & Kubovcik

[57] ABSTRACT

A polymeric material which is superior in mechanical strength, dimensional stability, moldability and resistances to chemicals, heat and abrasion comprises a copolymer composed of polymer chain moieties of a copolymer containing an imide compound of an $\alpha,\beta$-unsaturated dicarboxylic acid and polymer chain moieties of a polyamide, both chain moieties being bonded to each other. The material may be blended with thermoplastic resins. Furthermore, the material may be reinforced with glass fiber, etc.

59 Claims, 2 Drawing Figures

POLYMERIC MATERIALS AND NOVEL THERMOPLASTIC RESIN COMPOSITIONS

This application is a continuation of application Ser. No. 302,670, filed Sept. 15, 1981, now abandoned.

The present invention relates to a polymeric material obtained from a copolymer containing an imide compound of an $\alpha,\beta$-unsaturated dicarboxylic acid as a constituent and a polyamide and a thermoplastic resin composition comprising said polymeric material to which a thermoplastic resin is added. More particularly, it relates to a novel copolymer comprising polymer chain moieties derived from a copolymer containing an imide compound of an $\alpha,\beta$-unsaturated dicarboxylic acid and polymer moieties derived from a polyamide, both chain moieties being bonded to each other, a polymeric material containing said novel copolymer and a method for producing same. Moreover, it relates to a novel thermoplastic resin composition which comprises said novel copolymer and a thermoplastic resin.

Polystyrene, styrene-acrylonitrile copolymers, acrylonitrile-styrene-butadiene copolymers and similar polymeric materials have widely been used as molding materials because of their high dimensional stability and good moldability, while the improvement in their chemicals, thermal and abrasion resisting properties are still desired. On the other hand, polyamides have also been used widely as molding materials because of their superior resistance to chemicals, heat and abrasion. However, polyamides suffer from some disadvantages such as strong shrinkage during molding process which may cause "sink marks" and "warpage" in the molded articles; high hygroscopicity and significant decrease in mechanical strength and large dimensional change after they take up moisture.

It has been proposed that a polyamide is melt blended with polystyrene or a styrene-acrylonitrile copolymer in order to improve the hygroscopicity and other properties of the polyamide (Japanese Patent Examined Publication No. 7380/65). However, this technique involves serious disadvantages in that the styrene polymer or copolymer has so poor compatibility with polyamides that the molded articles from such blend show laminar peeling phenomenon and possess inferior mechanical strength. Because of this, such blend is not known as satisfactory molding material. In U.S. Pat. No. 3,966,839 it is disclosed that polystyrene and a polyamide are melt blended with addition of a small amount of a low molecular weight (1000 to 3000 M.W.) styrene-maleic anhydride copolymer which is used in order to improve the compatibility between the polyamide and polystyrene. By the addition of the low molecular weight styrene-maleic anhydride copolymer, an improvement is found in the compatibility between these polymers, but it is still insufficient so that when the blend is used in injection molding into complicated shape the above-mentioned peeling condition may occur, resulting in unfavorable mechanical strength of the molded article.

The inventors have made an intensive research to develop materials which possess excellent properties of both non-crystalline thermoplastic polymers and polyamides and as a result the present invention has been accomplished.

The present invention provides a polymeric material which predominantly comprises a novel copolymer composed of polymer chain moieties derived from a copolymer containing imide groups of dicarboxylic acid and polyamide chain moieties, both moieties being bonded to each other (said novel copolymer being hereinafter referred to merely as "novel copolymer").

The thermoplastic polymeric material provided in accordance with the present invention is a molding material having good mechanical strength, high dimensional stability, good moldability, and good resistance to chemicals, heat and abrasion.

In the accompanying drawing.

In order to allow a better understanding of the novel copolymers of the present invention, they are explained in comparison with a mixture of a styrene-acrylonitrile copolymer and a polyamide (which is hereinafter referred to as "mixture") in the following.

First, when subjected to solvent fractionation (using cresol/methyl ethyl ketone as a solvent system), the mixture is entirely separated into its individual components, i.e., the styrene-acrylonitrile copolymer and the polyamide, whereas the novel copolymer of the present invention cannot be fractionated, which indicates that the styrene copolymer containing imide groups of dicarboxylic acid is chemically bonded to the polyamide. In addition, from the facts that when the novel copolymer is dissolved and disintegrated in conc. hydrochloric acid the styrene copolymer remains and that the novel copolymer shows a peak in the proximity of the melting point of the polyamide in its thermal analysis, it can be seen that the novel copolymer has a particular structure in which the styrene copolymer chain moieties having imide groups of dicarboxylic acid are bound to the polyamide moieties.

Figure 1:
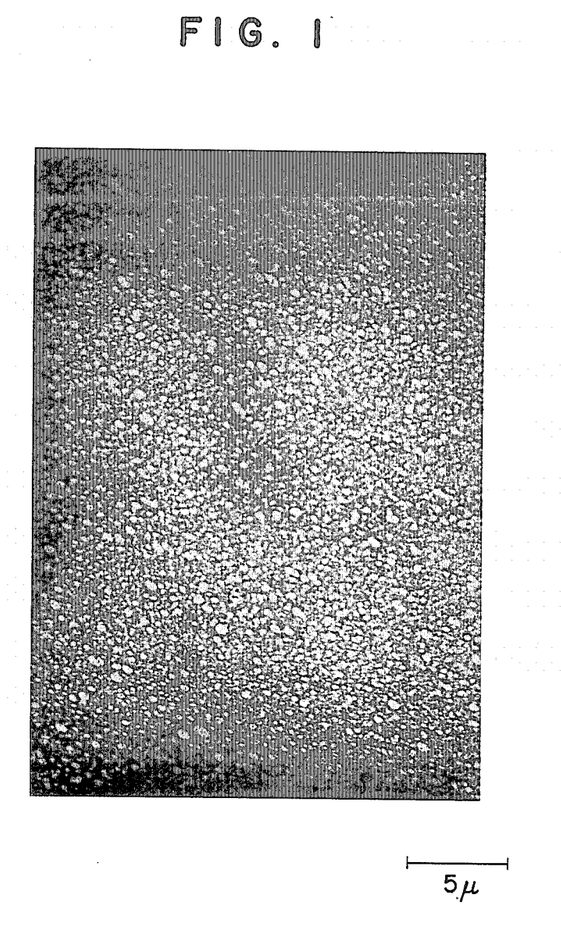
FIG. 1 is an electron micrograph of a polymeric material obtained from a styrene-N-phenylmaleinimide-acrylonitrile copolymer and polycaprolactam which is one preferred embodiment of the present invention.
Figure 2:
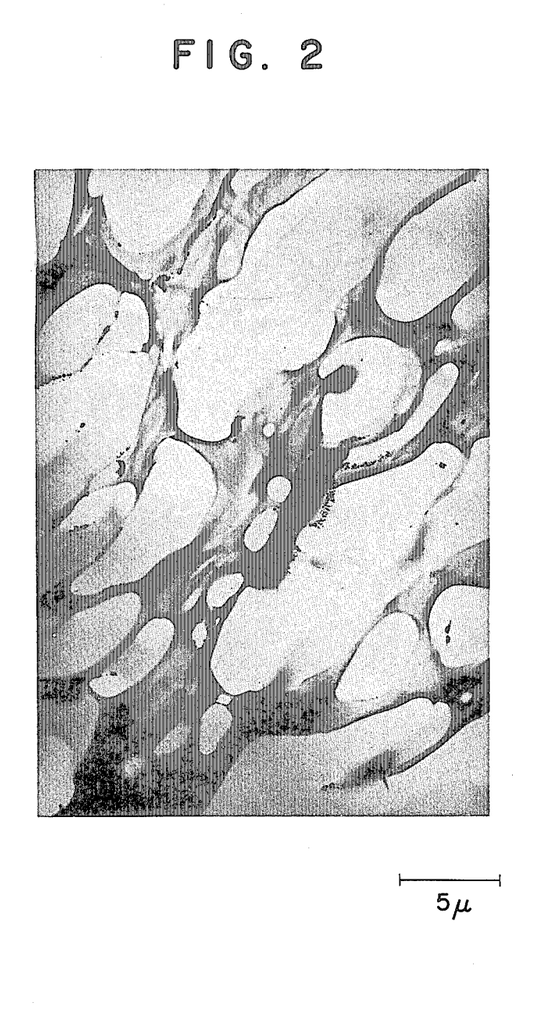
FIG. 2 is an electron micrograph of a mixture of a styrene-acrylonitrile copolymer and polycaprolactam.

Another difference is found in the electron micrographs. For example, in the electron micrograph of the polymeric material of the present invention which predominantly comprises the novel copolymer composed of styrene-N-phenylmaleinimide-acrylonitrile copolymer chain moieties and polycaprolactam chain moieties bonded to each other as shown in FIG. 1, a fine dispersion of particles is observed and it is so fine as to be unexpected from the large difference in solubility parameter between the styrene-N-phenylmaleinimide-acrylonitrile copolymer and the polycaprolactam. Such dispersion of particles is apparently distinct from the state of dispersion observed in the electron micrograph of a mixture of a styrene-acrylonitrile copolymer and polycaprolactam as shown in FIG. 2.

Under consideration of the above-mentioned significant difference in the dispersion state of particles, we have found that a polymeric material comprising a copolymer in which polymer chain moiety of the styrene copolymer and polymer chain moiety of the polyamide, both of said moieties being bonded each other, shows a fine dispersion state of particles (disperse phase) having an average particle diameter of not greater than $5\mu$, especially preferably not greater than $2\mu$. On the other hand, when no bonding above is allowed to occur between the polymer moieties, or when combinations of the styrene-acrylonitrile copolymer and the polyamide or the styrene-methyl methacrylate copolymer and the polyamide are blended without chemical bonding, only a dispersion is obtained where an average particle diameter of the dispersion phase is more than 5μ.

When evaluated as molding materials, those polymer blends in which any reaction between the polymeric components is not caused, for example, a resin mixture in the state of coarse dispersion which is prepared by melt kneading of a combination of a styrene-acrylonitrile copolymer and a polyamide or a styrene-methyl methacrylate copolymer and polyamide, are inferior in that the phenomenon of laminar peeling is observed in the molded articles formed from these mixtures by injection molding or other molding technique. In addition, these molded articles are inferior in the mechanical strength so that such unreacted polymer blends fail to provide satisfactory molded articles. On the contrary, polymeric materials containing the present novel copolymer where vinyl aromatic compound copolymer chain moieties and polyamide chain moieties are chemically bonded to each other by a reaction between polymeric components are excellent, because no laminar peeling is observed in injection molding articles formed therefrom and satisfactory molded articles having superior mechanical strength can be ontained.

There are a number of copolymers containing as a constituent an imide compound of α,β-unsaturated dicarboxylic acids which are used in the present invention and preferred are styrene copolymers containing imide groups of dicarboxylic acids and unsaturated carboxylic acid ester copolymers containing imide groups of dicarboxylic acids.

Compositions of vinyl aromatic compound copolymers are preferably 30 to 99 mol % of a vinyl aromatic compound, 1 to 30 mol % of an imide compound of α,β-unsaturated dicarboxylic acid and 0 to 60 mol % of a monomer copolymerizable with the vinyl aromatic compound and the imide compound of α,β-unsaturated dicarboxylic acid. Compositions of the unsaturated carboxylic acid ester copolymers are preferably 50 to 99 mol % of an α,β-unsaturated carboxylic acid ester, 1 to 30 mol % of imide compound of α,β-unsaturated dicarboxylic acid and 0 to 49 mol % of a monomer copolymerizable with the α,β-unsaturated carboxylic acid ester and the imide compound of α, β-unsaturated dicarboxylic acid.

Particularly important is the content of the imide groups of dicarboxylic acids which considerably affects the reactivity with polyamides. The content of the above ranges affords particularly favorable results in terms of mechanical strength of the resulting polymeric materials of the present invention.

Furthermore, molecular weight of the copolymers is preferably within the range of 10,000 to 300,000 A much lower molecular weight will result in reduction of mechanical strength and a much higher molecular weight will result in significantly decreased moldability of the resulting polymeric materials.

The vinyl aromatic compound copolymers and unsaturated carboxylic acid ester copolymers include rubber material-nonreinforced copolymers and impact-resistant rubber-reinforced copolymers. These copolymers can be produced according to the methods disclosed in Japanese Patent Unexamined Publication (Kokai) No. 93091/79, German Pat. No. 2,644,492, Canadian Pat. No. 847437, etc. using common techniques such as bulk polymerization, solution polymerization, suspension polymerization and emulsion polymerization wherein radical polymerization is utilized. They can also be produced by the treatment of a copolymer of a vinyl aromatic compound and an α,β-unsaturated cyclic anhydride with a basic nitrogen-containing compound as disclosed in U.S. Pat. No. 3,998,907, German Pat. No. 2,343,408, etc.

The imide compounds of α,β-unsaturated dicarboxylic acid which form the copolymers used in the present invention can be represented by the following general formula:

wherein $R_1$, $R_2$ and $R_3$ represent hydrogen, alkyl group, alkenyl group, cycloalkyl group, phenyl group, phenylene group, alkylene group, etc. Examples thereof are maleinimide, N-methylmaleinimide, N-butylmaleinimide, N-cyclohexylmaleinimide, N-phenylmaleinimide, N-(p-methylphenyl)maleinimide, N-(3,5-dimethylphenyl)maleinimide, N-(p-methoxyphenyl)-maleinimide, N-benzylmaleinimide, N-(1-naphthyl)maleinimide, etc.

As the vinyl aromatic compounds which form the copolymers used in the present invention there may be used styrene, o-methylstrene, p-methylstrene, dimethylstyrene, m-ethylstyrene, chlorostyrene, isopropylstyrene, tert-butylstyrene, α-methylstyrene, ethyl-vinyltoluene, etc. or mixtures thereof.

As the monomers copolymerizable with the vinyl aromatic compounds and the imide compounds of α,β-unsaturated dicarboxylic acid, there may be used α,β-unsaturated nitriles such as acrylonitrile, methacrylonitrile, etc., α,β-unsaturated carboxylic acid esters such as methyl methacrylate, butyl methacrylate, butyl acrylate, etc. and α,β-unsaturated carboxylic acids such as acrylic acid, methacrylic acid, etc.

As the α,β-unsaturated carboxylic acid esters which form the copolymers used in the present invention there may be used methacrylic acid esters such as methyl methacrylate, ethyl methacrylate, butyl methacrylate, 2-ethylhexyl methacrylate, 2-hydroxyethyl methacrylate, etc., acrylic acid esters such as ethyl acrylate, butyl acrylate, 2-ethylhexyl acrylate, 2-hydroxyethyl acrylate, etc. or mixtures thereof.

Moreover, as the monomers copolymerizable with the α,β-unsaturated carboxylic acid esters and the imide compounds of α,β-unsaturated dicarboxylic acids there may be used styrene compounds such as styrene, α-methylstyrene, vinyltoluene, etc., α,β-unsaturated nitriles such as acrylonitrile, methacrylonitrile, etc., α,β-unsaturated carboxylic acids such as acrylic acid, methacrylic acid, etc., monoolefins such as ethylene, propylene, isobutene, etc., vinyl acetate, vinyl ether, etc.

The rubber-reinforced vinyl aromatic compound copolymers and unsaturated carboxylic acid ester copolymers used in the present invention can be produced by polymerizing monomers in the presence of rubber-like polymers such as polybutadiene rubber, styrene-butadiene rubber, polybutene rubber, hydrogenated styrene-butadiene rubber, acrylonitrile-butadiene rubber, ethylene-propylene rubber, polyacrylate rubber, natural rubber, etc.

Suitable vinyl aromatic compound polymers used in the present invention are styrene-maleinimide copolymer, styrene-N-phenyl-maleinimide copolymer, styrene-N-phenylmaleinimide-acrylonitrile copolymer, styrene-N-phenylmaleinimide-methyl methacrylate copolymer, styrene-N-phenylmaleinimide-butyl acrylate copolymer, etc. and these copolymers which are reinforced with rubber.

The polymeric materials of the present invention obtained using styrene-N-phenylmaleinimide-acrylonitrile copolymer or styrene-N-phenylmaleinimide-methyl methacrylate copolymer which contain acrylonitrile or methyl methacrylate which has polarity provide molded products having better appearance and higher mechanical strength, wear resistance, etc. than those obtained using styrene-N-phenylmaleinimide copolymer. Reasons for those results are not clear, but it is supposed that the incorporation of the monomers having polarity brings about a homogeneous reaction of styrene copolymer and polyamide thereby to produce polymeric materials having a more uniform and finer micro-structure.

Suitable unsaturated carboxylic acid ester copolymers used in the present invention include methyl methacrylate-N-phenylmaleinimide copolymer, methyl acrylate-N-phenylmaleinimide copolymer, butyl acrylate-N-phenylmaleinimide copolymer, methyl methacrylate-N-phenylmaleinimide-styrene copolymer, butyl acrylate-N-phenylmaleinimide-styrene copolymer, methyl methacrylate-N-phenylmaleinimide-acrylonitrile copolymer, butyl acrylate-N-phenylmaleinimide-acrylonitrile copolymer, etc. and these copolymers which are reinforced with rubber Suitable polyamides used in the present invention are nylon 6 (polycaprolactam), nylon 6/6 (polyhexa-methylene adipamide), nylon 6/10, nylon-11, nylon-12, copolymer of terephthalic acid and trimethylhexamethylenediamine (Trogamid T produced by Dynamit Nobel Inc.), etc.

From the viewpoint of heat distortion resistance and mechanical properties of polymeric materials obtained, the molecular weight of the polyamide is preferably in a range of 10,000 to 50,000, more preferably 15,000 to 40,000.

The polymeric materials provided in accordance with the present invention, as previously mentioned, contain a novel copolymer comprising vinyl aromatic compound copolymer chain moieties or unsaturated carboxylic acid ester copolymer chain moieties and polyamide chain moieties which are bonded to each other. Said polymeric materials may comprise said novel copolymer alone or a mixture of said novel copolymer with copolymer containing imide groups of dicarboxylic acid and polyamide which remain unreacted. Content of the novel copolymer in the polymeric materials is at least 10% by weight, preferably at least 50% by weight.

The polymeric materials according to the present invention are thermoplastic and are much superior to non-crystalline polymers such as vinyl aromatic compound polymers, unsaturated carboxylic acid ester polymers, etc. in chemical resistance, heat resistance and abrasion resistance and they show greatly reduced molding shrinkage and greatly improved hygroscopicity as compared with polyamides. They also possess a good dimensional accuracy. Because of these properties, they are useful as molding materials in the production of large-sized moldings and precision moldings. Furthermore, they are so improved in melt strength over polyamides that they are also suitable for extrusion molding and blow molding and can be utilized for production of films, sheets, bottles and laminates and for wire coating. They are also suitable as materials in production of foams and fibers Moreover, the polymeric materials of the present invention are superior in heat stability at high temperatures to those obtained from styrene-$\alpha,\beta$-unsaturated dicarboxylic anhydride copolymer which contains anhydride group in the copolymer and polyamide as disclosed in Japanese Patent Applications No. 127298/79 and No. 129467/79. They can be molded at molding temperatures in a wide range and can provide good moldings having no silver streaks even at high temperatures.

The polymeric materials of the present invention can be prepared by reacting under melt kneading a copolymer containing an imide compound of $\alpha,\beta$-unsaturated dicarboxylic acid as a constituent with polyamide. The reaction under melt kneading can be effected using a conventional melt kneading apparatus for resins such as a kneader, Bumbury mixer or twin-screw extruder. The melt kneading must be carried out under sufficient shearing force. If the shearing force is insufficient to achieve a proper melt kneading, it is difficult to bring about the reaction between the polymers. The temperature is in the range of 220° to 330° C., preferably 260° to 300° C. If the melt kneading temperature is too low, the reaction hardly occurs and if too high, thermal decomposition of the polymers occurs. The shearing force and temperature during melt kneading are important in the production of the polymeric materials of the present invention. A reaction accelerator may be added at the time of melt kneading.

The content of imide group of dicarboxylic acid in the copolymer containing imide compound of $\alpha,\beta$-unsaturated dicarboxylic acid is important. The content of too high or low results in improper reactivity with polyamide and thus polymeric materials having preferable mechanical strength cannot be obtained The fact that the melt kneading of the copolymer containing an imide compound of $\alpha,\beta$-unsaturated dicarboxylic acid as a constituent and polyamide brings about a reaction between the polymers can be confirmed by the melt and solution viscosities of the polymeric materials of the present invention which are higher than those of the copolymers containing imide compound of $\alpha,\beta$-unsaturated dicarboxylic acid as a constituent and polyamide before reaction. On the other hand, mixture of a styrene-acrylonitrile copolymer and a polyamide which do not react therebetween shows a melt viscosity and a solution viscosity each lying between that of the styrene-acrylonitrile copolymer and that of the polyamide before mixing and the melt and solution viscosities are additive.

The proportion of the copolymer containing imide compound of $\alpha,\beta$-unsaturated dicarboxylic acid and the polyamide which are melt kneaded in production of the polymeric materials of the present invention may be optionally chosen from the range of 1-99:99-1.

Furthermore, novel thermoplastic resin compositions having preferred properties can be obtained by blending a thermoplastic resin with the novel copolymer mentioned above which comprises polymer chain moieties derived from copolymer containing imide compound of $\alpha,\beta$-unsaturated dicarboxylic acid and polymer chain moieties derived from polyamide which are bonded to each other. Especially, there are obtained resin compositions wherein a polyamide which is a crystalline polymer and a non-crystalline polymer such as vinyl aromatic compound polymer, polycarbonate, etc. are in a good compatible state.

The novel thermoplastic resin compositions of the present invention can be obtained from a copolymer containing imide compound of α,β-unsaturated dicarboxylic acid, a polyamide and a thermoplastic resin as a third component. Therefore, it can be said that they are resin compositions which comprise a copolymer containing imide compound of α,β-unsaturated dicarboxylic acid, a polyamide and a thermoplastic resin as a third component.

Preferred copolymers containing imide compound of α,β-unsaturated dicarboxylic acid used in the present resin compositions are vinyl aromatic compound copolymers containing imide group of dicarboxylic acid and unsaturated carboxylic acid ester copolymers containingimide group of dicarboxylic acid. It is preferred to use copolymers having compositions and molecular weight within the ranges as previously mentioned. With reference to polyamides, it is also preferred to use polycaprolactam, polyhexamethylene adipamide having a molecular weight in the range of 10,000 to 50,000, especially preferably 15,000 to 40,000.

There are many thermoplastic resins which can be used as the third component. Examples of such resins are vinyl aromatic compound resins, polymethyl methacrylate resins, polycarbonate resins, polysulfone resins, polyarylate resins, polyamide resins, polybutylene terephthalate resins, polyethylene terephthalate resins, styrene-butadiene block copolymer elastomers, hydrogenated styrene-butadiene block copolymer elastomers, thermoplastic polyester elastomers, etc.

The vinyl aromatic compound resins include polystyrene, rubber-reinforced impact-resistant polystyrene, AS resin (styrene-acrylonitrile copolymer resin), ABS resin (styrene-acrylonitrile-butadiene copolymer resin), AES resin (ethylene-propylene rubber-reinforced styrene-acrylonitrile copolymer resin), AAS resin (polyacrylate rubber-reinforced styrene-acrylonitrile copolymer resin), MS resin (styrene-methyl methacrylate copolymer resin), MBS resin (styrene-methyl methacrylate-butadiene copolymer resin), etc.

Especially preferred combinations are vinyl aromatic compound copolymers containing imide compound of α,β-unsaturated dicarboxylic acid as a constituent which have the composition of 70 to 99 mol % of a styrene compound and 1 to 30 mol % of N-phenylmaleinimide in the case of polystyrene or rubber-reinforced impact resistant polystyrene and copolymers having the composition of 30 to 97 mol % of a styrene compound, 1 to 30 mol % of an imide compound of an α,β-unsaturated dicarboxylic acid and 2 to 60 mol % of an α,β-unsaturated nitrile or copolymers having the composition of 30 to 97 mol % of a styrene compound, 1 to 30 mol % of an imide compound of α,β-unsaturated dicarboxylic acid and 2 to 50 mol % of an α,β-unsaturated carboxylic acid ester in the case of AS resin, ABS resin, AES resin, AAS resin, MS resin and MBS resin.

The present invention will be explained more clearly by the specific embodiment. There are conspicuous differences in mechanical properties of resin, microstructure of polymers, etc. between the resin composition of the present invention obtained from styrene-acrylonitrile-N-phenylmaleinimide copolymer, polyamide and ABS resin and a resin composition obtained from a polyamide and ABS resin. According to the observation by an electron microscope the micro-structure of the resin composition of the present invention has fine and uniform dispersion state of less than 10μ which shows good compatibility between polymers while that of the resin composition obtained from polyamide and ABS resin has coarse and ununiform dispersion state of 20μ or more which shows extremely inferior compatibility.

Furthermore, excellent molded articles can be obtained from the resin composition of the present invention by injection molding while molded articles obtained by injection molding from a resin composition comprising polyamide and ABS resin show laminar peeling phenomenon and are inferior in mechanical strength. The resin composition of the present invention which contains a novel copolymer comprising styrene-acrylonitrile-N-phenylmaleinimide copolymer chain moieties and polyamide moieties bonded to each other and which is obtained from a styrene-acrylonitrile-N-phenyl-maleinimide copolymer, a polyamide and ABS resin is far more preferred as a molding material than a mixture obtained from polyamide and ABS resin in mechanical properties, etc.

It will be recognized that the presence of the novel copolymer of the present invention has a great effect on improvement of compatibility of polyamide and ABS resin.

The polymethyl methacrylate resin include polymethyl methacrylate, rubber-reinforced polymethyl methacrylate, MS resin(methyl methacrylate-styrene copolymer resin), MBS resin (methyl methacrylate-styrene-butadiene copolymer resin), etc.

It is preferred to use the polymethyl methacrylate resin in combination with a copolymer having the composition of 50 to 99 mol % of α,β-unsaturated carboxylic acid ester, 1 to 30 mol % of imide compound of α,β-unsaturated dicarboxylic acid and 0 to 49 mol % of a monomer copolymerizable with the α,β-unsaturated carboxylic acid ester and the imide compound of α,β-unsaturated dicarboxylic acid.

Polycarbonate resins sold from various companies may be used. It is preferred to use polycarbonate resins in combination with a copolymer having the composition of 1 to 30 mol % of an imide compound of α,β-unsaturated dicarboxylic acid, 30 to 89 mol % of a styrene compound and 10 to 50 mol % of an α,β-unsaturated nitrile or a copolymer having the composition of 1 to 30 mol % of imide compound of α,βunsaturated dicarboxylic acid, 10 to 90 mol % of α,β-unsaturated carboxylic acid ester and 0 to 89 mol % of styrene compound Udel(trademark) sold from Union Carbide Corporation or Nissan Chemical Co., Ltd. is an example of polysulfone resins and U Polymer sold from Unitika Ltd. is an example of polyarylate resins.

Examples of polyamide resins are nylon-6, nylon 6/6, nylon 6/10, nylon 11, nylon 12, copolymer of terephthalic acid and trimethylhexamethylenediamine (Torogamid T produced by Dynamit Nobel Inc.), etc.

The mixing ratio of the novel copolymer and thermoplastic resin in the resin composition of the present invention may be freely chosen so long as preferred dispersion state can be attained, but when content of the novel copolymer is too small, fine dispersion state can hardly be obtained and it is preferably contained in an amount of at least 10% by weight in the resin composition. This content of the novel copolymer may be increased to obtain finer dispersion state in the resin composition. The dispersion state of resin composition also varies depending on the kind of the thermoplastic resin in the resin composition. Average particle diameter of the dispersion phase may vary depending on the purpose, but is usually not more than 10μ, preferably not more than 5μ, more preferably not more than 3μ and most preferably not more than 1μ.

Preferred resin compositions of the present invention comprise 5 to 70% by weight of a copolymer containing an imide compound of α,β unsaturated dicarboxylic acid, 5 to 80% by weight of a polyamide and 10 to 90% by weight of a thermoplastic resin.

Content of the novel copolymer in the resin composition of the present invention may be such that provides a dispersion state of not more than 15μ, but is preferably at least 10% by weight, especially preferably at least 30% by weight. With increase in the content of the novel copolymer, the dispersion state becomes finer and more preferred molding materials can be obtained.

Proportion of chain moieties of copolymer containing imide compound of α,β-unsaturated dicarboxylic acid and polyamide chain moieties in the novel copolymer may be such that provides preferred resin composition of the present invention and it has no specific limitation. However, if either one of them is too high or too low, dispersibility cannot be favourably affected and so such proportion should be avoided.

The resin composition of the present invention can be produced by preparing a novel copolymer from a copolymer containing imide compound of α,β-unsaturated dicarboxylic acid and a polyamide and melt mixing thus obtained novel copolymer with a thermoplastic resin. Futhermore, the resin composition of the present invention can be obtained simultaneously with formation of the novel copolymer by melt mixing a copolymer containing imide compound of α,β-unsaturated dicarboxylic acid, a polyamide and a thermoplastic resin. The reaction under melt kneading can be effected using a conventional melt kneading apparatus for resins such as a kneader, Bumbury mixer or twin-screw extruder. The melt kneading must be carried out under sufficient shearing force. If the shearing force is insufficient to achieve a proper melt kneading, it is difficult to bring about the reaction between the polymers. The temperature is in the range of 220° to 330° C., preferably 260° to 300° C. If the melt kneading temperature is too low, the reaction hardly occurs and if too high, thermal decomposition of the polymers occurs. The shearing force and temperature during melt kneading are important in the production of the polymeric materials of the present invention. A reaction accelerator may be added at the time of melt kneading.

The novel thermoplastic resin compositions according to the present invention are much superior to non-crystalline polymers such as vinyl aromatic compound resins, polymethyl methacrylate resins, polycarbonate resins, etc. in chemical resistance, heat resistance and abrasion resistance and they show greatly reduced molding shrinkage and greatly improved hygroscopicity as compared with polyamide resins. They also possess a good dimensional accuracy. Because of these properties, they are useful as molding materials in the production of large-sized moldings and precision moldings. Furthermore, they are so improved in melt strength over polyamides that they are also suitable for extrusion molding and blow molding and can be utilized for production of films, sheets, bottles and laminates and for wire coating. They are also suitable as materials in production of foams and fibers.

Pigments, dyes, thermal stabilizers, UV absorbers, plasticizers, nucleating agents, flame retardant, etc. may be added to the polymeric materials and the thermoplastic resins of the present invention. Particularly, weathering deterioration of the polymeric material and the novel thermoplastic resin can be greatly controlled by adding antioxidants such as bisphenol, propionate and phosphite compounds and UV absorbers such as phenyl salicylate, benzophenone, benzotriazole compounds, etc.

It is possible to use the polymeric materials and thermoplastic resins of the present invention as composite materials in combination with fibrous reinforcing materials such as glass fiber, carbon fiber, aromatic polyamide fiber, asbestos, etc. and/or inorganic fillers such as calcium carbonate, talc, zinc oxide, silica, etc. A conspicuous improvement in heat resistance can be achieved, particularly by combination with glass fiber thereby providing molding materials with good mechanical properties. As a further favorable feature, such composite materials show much better paintability than that of glass fiber-reinforced polyamides and glass fiber-reinforced styrene resins. Moreover, the glass fiber-reinforced resin compositions of the present invention cause less warp in molded articles than that in molded articles obtained from glass fiber-reinforced polyamides. Therefore, they will provide the most preferable molding materials that have ever been proposed in the field of the production of large-sized molded articles and precision molded articles such as automobile parts, appliance parts, etc.

Content of the glass fiber in the glass fiber-reinforced resin composition of the present invention is preferably 5 to 60% by weight. When it is more than this range, processability decreases and when less than this range, sufficient reinforcing effect cannot be obtained.

The glass fiber-reinforced resin composition may be obtained by previously making the polymeric material or resin composition, then blending them with glass fiber and melt mixing them by an extruder. Furthermore, a mixture of the copolymer containing imide compound of α,β-unsaturated dicarboxylic acid as a constituent and a polyamide and, optionally a thermoplastic resin as a third component with glass fiber may directly be put in a hopper of an injection molder to obtain a molded article simultaneously with melt mixing of them or said mixture may be melt kneaded by an extruder to obtain a glass fiber-reinforced resin composition.

Furthermore, a part of the glass fiber in the resin composition of the present invention may be replaced with fibrous reinforcing materials such as asbestos, carbon fiber, aromatic polyamide fiber, potassium titanate fiber, etc. or inorganic fillers such as calcium carbonate, talc, titanium oxide, zinc oxide, magnesium hydroxide, etc.

The following examples will further illustrate the present invention without limiting the invention thereto.

EXAMPLE 1 and COMPARATIVE EXAMPLE 1

Fifty parts by weight of polycaprolactam (Amilan [trademark] CM1017, Toray Co., Ltd.) was mixed with 50 parts by weight of styrene-N-phenylmaleinimide-acrylonitrile copolymer (content of N-phenylmaleinimide 12 mol % and content of acrylonitrile 35 mol %) having $\eta sp/c = 1.05$ (measured in a mixed solvent of m-cresol/methyl ethyl ketone=9/1 at 30° C.) [Example 1] and with 50 parts by weight of styrene-acrylonitrile copolymer (content of acrylonitrile 45 mol %) having $\eta sp/c = 1.30$ [Comparative Example 1] in pellet form, respectively. Each of the mixtures was melt kneaded at 260° C. by a twin-screw extruder. Thus obtained reaction product of polycaprolactam with styrene-N-phenylmaleinimide-acrylonitrile copolymer and mixture of polycaprolactam with styrene-acrylonitrile copolymer were subjected to the following tests.

(1) Observation by electron microscope

The electron micrograph (FIG. 1) of the reaction product of styrene-N-phenylmaleinimide-acrylonitrile copolymer with polycaprolactam shows very fine dispersion of particles of 500 to 5000 Å. On the other hand, the electron micrograph (FIG. 2) of the mixture of styrene-acrylonitrile copolymer with polycaprolactam shows coarse dispersion of particles of about $10\mu$ and incompatible state between the polymers is observed. A great difference is seen between these electron micrographs.

(2) Solvent fractionation test

A 10 g sample each of the reaction product styrene-N-phenylmaleinimide-acrylonitrile copolymer with polycaprolactam and the mixture of styrene-acrylonitrile copolymer with polycaprolactam was weighed and dissolved in a mixed solvent of cresol and methyl ethyl ketone (9/1). Both were completely dissolved remaining no insolubles. The resulting solution was added to a large amount of methyl ethyl ketone to completely separate out a precipitate. This precipitate was collected and was referred to as polymer (I). Weight of polymer (I) in the case of the reaction product was 8.0 g and that in the case of the mixture was 5.1 g. From the remaining solution the dissolved polymer was recovered and was referred to as polymer (II). Weight of polymer (II) in the case of the reaction product was 1.7 g and that in the case of the mixture was 4.6 g. Then, polymers (I) and (II) were subjected to infrared spectroscopic analysis. In the case of the reaction product, both the polymers (I) and (II) showed the spectrum each of the styrene-N-phenylmaleinimide-acrylonitrile copolymer and polycaprolactam while in the case of the mixture, the spectrum of polymer (I) corresponded to that of polycaprolactam and the spectrum of polymer (II) corresponded to that of the styrene-acrylonitrile copolymer.

It is apparent from the results of this solvent fractionation test that there was formed a copolymer where the styrene-N-phenylmaleinimide-acrylonitrile copolymer and the polycaprolactam are bonded to each other.

Test pieces were prepared from the reaction product, the mixture, the styrene-N-phenylmaleinimide-acrylonitrile copolymer and the styrene-acrylonitrile copolymer by injection molding and the tensile strength, Izod impact strength and heat distortion temperature of these test pieces were measured in accordance with JIS Test Method K6871. Melt flow index of them was measured in accordance with ASTM D1238 (at 230° C. under a load of 3.8 kg). The peeling state of the molded articles was determined by subjecting the test pieces to peeling test which comprises applying an adhesive tape to rupture cross-section and then removing the tape and observing the state of cross-section by naked eye. Furthermore, solution viscosity was also measured.

The results are shown in Table 1. As recognized from them, the molded article obtained from the reaction product is much improved in both tensile strength and impact strength over that obtained from the styrene-N-phenylmaleinimide-acrylonitrile copolymer while the molded article from the mixture is lower in mechanical strength than the styrene-acrylonitrile copolymer. The melt flow index of the reaction product is lower than that of the styrene-N-phenylmaleinimide-acrylonitrile copolymer (namely, melt viscosity of the reaction product is higher than that of the copolymer) while the melt flow index of the mixture is much higher than that of the styrene-acrylonitrile copolymer (namely, melt viscosity of the mixture is much lower than the copolymer).

Moreover, solution viscosity of the reaction product is much higher than that of both the polycaprolactam ($\eta sp/c = 1.25$) and styrene-N-phenylmaleinimide-acrylonitrile copolymer while no such result is seen in the case of the mixture.

Abrasion resistance and chemical resistance of the styrene-N-phenylmaleinimide-acrylonitrile copolymer used in Example 1 and those of the reaction product of Example 1 are shown in Table 2. The abrasion resistance is expressed by abrasion wear (mg) when subjected to Taber machine and the chemical resistance is expressed by % critical strain at which a crack occurs when the test piece is in contact with the chemical. Molding shrinkage at injection molding of the polycaprolactam used in Example 1 and the reaction product of Example 1 is shown in Table 3. The shrinkage was measured using a plate of $150 \times 150 \times 3$ mm. Water absorption of the polycaprolactam and the reaction product of Example 1 is shown in Table 4. The water absorption was measured from increment in weight of the injection molded test pieces when they were dipped in warm water of 80° C. for 40 minutes.

TABLE 1

| Resin | Example 1 ST—PMI—AN/N—6 Reaction Product | ST—MI—AN | Comp. Ex. 1 ST—AN/ N—6 Mixture | ST—AN |
|---|---|---|---|---|
| Tensile Strength (kg/cm$^2$) | 840 | 680 | 520 | 780 |
| Izod Impact Strength (kg · cm/cm Unnotch) | 51 | 10 | 18 | 18 |
| Heat Distortion Temp. (°C.) | 115 | 110 | 106 | 94 |
| Melt Flow Index (g/10 min.) | 1.8 | 2.8 | 77 | 3.5 |
| State of Dispersion (on Electron | Fine (500–5000Å) | — | Non-homogeneous ($<10\mu$) | — |

TABLE 1-continued

| Resin | Example 1 ST—PMI—AN/N—6 Reaction Product | ST—MI—AN | Comp. Ex. 1 ST—AN/N—6 Mixture | ST—AN |
|---|---|---|---|---|
| Microscope) Peeling of Molding | None | — | Severe | — |
| Solution Viscosity ($\eta sp/c$) | 1.68 | 1.05 | 1.27 | 1.30 |

ST—PMI—AN: Styrene-N—phenylmaleinimideacrylonitrile copolymer
ST—AN: Styrene-acrylonitrile copolymer
N—6 Polycaprolactam (Nylon 6)

TABLE 2

| | Abrasion Loss (mg) | Chemical Resistance (Critical Strain %) | |
|---|---|---|---|
| | | Ethyl Alcohol | Gasoline |
| Reaction Product of Example 1 | 19 | 0.59 | 0.70< |
| Styrene-N—phenylmalein-imide-acrylonitrile copolymer used in Example 1 | 75 | 0.20 | 0.15 |

TABLE 3

| | Molding Shrinkage (%) |
|---|---|
| Reaction Product of Example 1 | 0.79 |
| Polycaprolactam | 1.53 |

TABLE 4

| | Water Absorption (%) |
|---|---|
| Reaction Product of Example 1 | 0.85 |
| Polycaprolactam | 1.7 |

EXAMPLES 2-6

Reaction products were obtained by carrying out the melt kneading under the same conditions as in Example 1 except that the styrene-N-phenylmaleinimide-acrylonitrile copolymer used in Example 1 was substituted with a styrene-N-phenylmaleinimide-acrylonitrile copolymer having different composition from that of Example 1 ($\eta sp/c = 0.93$, content of the N-phenylmaleinimide 7 mol % and content of the acrylonitrile 25 mol %), [Example 2], a styrene-N-phenylmaleinimide-methyl methacrylate copolymer ($\eta sp/c = 0.95$, content of N-phenylmaleinimide 10 mol % and content of methyl methacrylate 15 mol %)[Example 3], a styrene-N-phenylmaleinimide copolymer ($\eta sp/c = 0.87$, content of N-phenylmaleinimide 14 mol %) [Example 4], a styrene-maleinimide copolymer ($\eta sp/c = 0.85$, content of maleinimide 10 mol %) [Example 5] and a rubber-reinforced styrene-N-phenylmaleinimide copolymer (content of rubber-like polymer 8% by weight and content of N-phenylmaleinimide 12 mol %) [Example 6]. The resultant reaction products were subjected to the solvent fractionation test of Example 1 to confirm that copolymers where styrene copolymer chain and polycaprolactam chain are bonded to each other were formed in all reaction products. Moreover, observation by an electron microscope showed fine dispersion state of particles of $2\mu$ or less. Measurement of properties was effected and the results are shown in Table 5.

COMPARATIVE EXAMPLES 2-4

Resin mixtures were obtained by effecting the melt kneading under the same conditions as in Comparative Example 1 except that the styrene-acrylonitrile copolymer of Comparative Example 1 was substituted with a styrene-methyl methacrylate copolymer ($\eta sp/c = 1.02$, content of methyl methacrylate 15 mol %)[Comparative Example 2], a polystyrene ($\eta sp/c = 0.90$) [Comparative Example 3], and a rubber-reinforced polystyrene(-content of rubber-like polymer 8% by weight) [Comparative Example 4]. The resultant mixtures were subjected to the solvent fractionation test of Example 1, but formation of copolymers comprising styrene copolymer chain and polycaprolactam chain which were bonded to each other was not recognized. Electron micrographs shows coarse dispersion state of particles of $10\mu$ or more. Injection molded articles therefrom showed serious peeling phenomena and were inferior in mechanical strength.

EXAMPLE 7

Reaction products were obtained under the same conditions as in Example 1 except that the polycaprolactam in Example was substituted with polyhexamethylene adipamide (LEONA [trademark] 1200S, Asahi Chemical) and melt kneading temperature was 280° C. Formation of copolymers comprising styrene copolymer chain and polyhexamethylene adipamide chain which were bonded to each other was confirmed by the solvent fractionation test. Results of the tests for properties are shown in Table 5.

TABLE 5

| Resin | Example 2 ST—PMI—AN/N—6 | Example 3 ST—PMI—MMA/N—6 | Example 4 ST—PMI/N—6 | Example 5 ST—MI/N—6 | Example 6 Rubber-reinforced ST—PMI/N—6 | Example 7 ST—PMI—AN/N—6,6 |
|---|---|---|---|---|---|---|
| Tensile Strength (kg/cm²) | 780 | 750 | 580 | 600 | 540 | 840 |
| Izod Impact Strength (kg · cm/cm Unnotch) | 45 | 47 | 35 | 32 | 100< | 48 |
| Heat Distortion Temp. | 110 | 112 | 114 | 109 | 111 | 115 |

TABLE 5-continued

| Resin | Example 2 ST—PMI—AN/ N—6 | Example 3 ST—PMI— MMA/N—6 | Example 4 ST—PMI/ N—6 | Example 5 ST—MI/ N—6 | Example 6 Rubber-reinforced ST—PMI/N—6 | Example 7 ST—PMI—AN/ N—6,6 |
|---|---|---|---|---|---|---|
| (°C.) | | | | | | |
| Melt Flow Index (g/10 min.) | 2.0 | 5.6 | 3.3 | 2.5 | 6.0 | — |
| Peeling of Molding | None | None | None | None | None | None |

ST—PMI—MMA: Styrene-N—phenylmaleinimide-methyl methacrylate copolymer
ST—PMI: Styrene-N—phenylmaleinimide copolymer
ST—MI: Styrene-maleinimide copolymer
N—6,6: Polyhexamethylene adipamide (nylon-6,6)

EXAMPLES 8 and 9

Reaction product were obtained in the same manner as in Example 1 with mixing ratios of the polycaprolactam and the styrene-N-phenylmaleinimide-acrylonitrile copolymer as shown in Table 6. The resultant reaction products were subjected to the solvent fractionation test of Example 1 to confirm formation of copolymers comprising styrene copolymer chain and polycaprolactam chain which were bonded to each other. Properties measured are shown in Table 6.

TABLE 6

| | Example 8 | Example 9 |
|---|---|---|
| ST—PMI—AN | 25 parts | 75 parts |
| N—6 | 75 parts | 25 parts |
| Tensile Strength (kg/cm$^2$) | 850 | 690 |
| Izod Impact Strength (kg · cm/cm Unnotch) | 100< | 22 |
| Heat Distortion Temp. (°C.) | 115 | 113 |
| Melt Flow Index (g/10 min.) | 6.8 | 3.5 |
| Peeling of Molding | None | None |

EXAMPLE 10 and COMPARATIVE EXAMPLE 5

Fifty parts by weight of polycaprolactam (AMILAN [trademark] CM1017, Toray Co., Ltd.) was mixed with 50 parts by weight of a methyl methacrylate-N-phenylmaleinimide-styrene copolymer (content of N-phenylmaleinimide 7 mol % and content of styrene 20 mol %) of $\eta$sp/c=0.85 (measured in a mixed solvent of m-cresol/methyl ethyl ketone=9/1 at 30° C.) [Example 10] and 50 parts by weight of methyl methacrylate-styrene copolymer (content of styrene 20 mol %) of $\eta$sp/c=1.05 [Comparative Example 5] in pellet form, respectively and each of the mixtures was melt kneaded by a twin-screw extruder at 260° C. The resultant reaction product of polycaprolactam and methyl methacrylate-N-phenylmaleinimide-styrene copolymer and mixture of polycaprolactam and methyl methacrylate-styrene copolymer were subjected to the following test.

Observation by electron microscope

The observation of the reaction product of methyl methacrylate-N-phenylmaleinimide-styrene copolymer and polycaprolactam according to the present invention by electron microscope showed fine dispersion state of particles of 2μ or less. On the other hand, the observation of the mixture of methyl methacrylate-styrene copolymer and polycaprolactam showed coarse dispersion state of particles of about 10μ and there was seen incompatibility between the polymers.

Test pieces were prepared from the reaction product and the mixture by injection molding. Tensile strength, Izod impact strength and heat distortion temperature of these test pieces were measured in the same manner as in Example 1. Also, the degree of peeling of the test pieces was evaluated. Solution viscosity was also measured.

The results are shown in Table 7. Solution viscosity of the reaction product was much higher than that of the polycaprolactam ($\eta$sp/c=1.25) and the methyl methacrylate-N-phenylmaleinimide-styrene copolymer while no such result was seen in the case of the mixture.

EXAMPLE 11

Reaction products were obtained in the same manner as in Example 10 except that the polycaprolactam in Example 10 was substituted with polyhexamethylene adipamide (LEONA [trademark] 1200S, Asahi Chemical) and melt kneading temperature was 280° C. The reaction products were also subjected to the solvent fractionation test of Example 1 to confirm formation of copolymers comprising α,β-unsaturated carboxylic acid ester copolymer chain and polyhexamethylene adipamide chain which were bonded to each other. The properties measured are shown in Table 7.

TABLE 7

| Resin | Example 10 MMA—PMI—ST/N—6 Reaction Product | Comp. Ex. 5 MMA—ST/N—6 Mixture | Example 11 MMA—PMI—ST/N—6,6 Reaction Product |
|---|---|---|---|
| Tensile Strength (kg/cm$^2$) | 790 | 500 | 820 |
| Izod Impact Strength (kg · cm/cm Unnotch) | 45 | 14 | 43 |
| Heat Distortion Temp. (°C.) | 112 | 103 | 114 |
| Melt Flow Index (g/10 min.) | 2.5 | 85 | — |
| State of Dispersion on Electron Microscope | Fine (2μ or less) | Non-homogeneous (~10μ) | Fine (2μ or less) |
| Peeling of Molding | None | Severe | None |
| Solution Viscosity ($\eta$sp/c) | 1.75 | 1.17 | — |

MMA—PMI—ST: Methyl methacrylate-N—phenylmaleinimide-styrene copolymer
MMA—ST: Methyl methacrylate-styrene copolymer
N—6: Polycaprolactam (nylon-6)
N—6,6: Polyhexamethylene adipamide (nylon-6,6)

EXAMPLE 12

Fifty parts by weight of the polycaprolactam used in Example 1, 25 parts by weight of the styrene-N-phenyl-maleinimide-acrylonitrile copolymer used in Example 1 and 25 parts by weight of ABS resin (obtained by emulsion graft polymerization of 25 parts by weight of a styrene monomer and 15 parts by weight of acrylonitrile in the presence of 60 parts by weight of polybutadiene latex) were mixed and melt kneaded by a twin-screw extruder at 260° C. to obtain a thermoplastic resin composition. Observation of this composition by electron microscope showed homogeneous dispersion of rubber particles and good compatibility between polymers. Results of measurement of properties are shown in Table 8.

COMPARATIVE EXAMPLE 6

Melt kneading was effected in the same manner as in Example 12 except that the styrene-N-phenylmaleinimide-acrylonitrile copolymer in Example 12 was substituted with a styrene-acrylonitrile copolymer (content of acrylonitrile 45 mol %) of $\eta sp/c = 1.30$ to obtain a thermoplastic resin composition. Observation of the composition by an electron microscope showed coarse, nonhomogeneous dispersion state of about 20μ and incompatibility between polycaprolactam and ABS resin. Results of measurement of properties are shown in Table 8.

EXAMPLE 13

Fifty parts by weight of the polycaprolactam used in Example 10, 30 parts by weight of the methyl methacrylate-N-phenylmaleinimde-styrene copolymer used in Example 10 and 20 parts by weight of a rubber-reinforced polymethyl methacrylate (obtained by emulsion graft polymerization of 40 parts by weight of methyl methacrylate in the presence of 60 parts by weight of polybutadiene latex) were mixed and melt kneaded by a twin-screw extruder at 260° C. to obtain a thermoplastic resin composition. Observation of this composition by electron microscope showed homogeneous dispersion state of polymers. Results of property tests are shown in Table 8.

EXAMPLE 14

Fifty parts by weight of the reaction product of polycaprolactam and styrene-N-phenylmaleinimide-acrylonitrile copolymer which was obtained in Example 1 and 50 parts by weight of ABS resin (obtained by emulsion graft polymerization of 40 parts by weight of styrene monomer and 20 parts by weight of acrylonitrile in the presence of 40 parts by weight of polybutadiene latex) were mixed and melt kneaded by a twin-screw extruder at 260° C. to obtain a thermoplastic resin composition. Observation of this composition by electron microscope showed homogeneous dispersion state of polymers. Results of property tests are shown in Table 8.

EXAMPLE 15

Fifteen parts by weight of the styrene-N-phenylmaleinimide copolymer used in Example 4, 15 parts by weight of polycaprolactam used in Example 4, 67 parts by weight of a rubber-reinforced impact-resistant polystyrene (content of polybutadiene 20% by weight and obtained by solution polymerization) and 3 parts by weight of a hydrogenated styrene-butadiene block copolymer (KRATON G1650 Shell Co.) were mixed and melt kneaded by a twin-screw extruder at 260° C. to obtain a thermoplastic resin composition. Observation of this composition under electron microscope showed homogeneous dispersion state of polymers. Results of property tests are shown in Table 8.

EXAMPLE 16

Fifty parts by weight of the polycaprolactam used in Example 1, 25 parts by weight of the styrene-N-phenyl-maleinimide-acrylonitrile copolymer used in Example 1 and 25 parts by weight of polycarbonate resin (PANLITE L-1225 Teijin Chemical) were mixed and melt kneaded by a twin-screw extruder at 280° C. to obtain a thermoplastic resin composition. Observation of this composition by electron microscope showed homogeneous dispersion state of polymers. Results of property tests are shown in Table 8.

TABLE 8

| Resin | Example 12 ST—PMI—AN/ N—6/ABS | Comp. Ex. 6 ST—AN/N—6/ ABS | Example 13 MMA—PMI— ST/N—6/ MMA—3D | Example 14 ST—PMI—AN/ N—6/ABS | Example 15 ST—PMI/N—6/ HIPS/HSB | Example 16 ST—PMI—AN/ N—6/PC |
|---|---|---|---|---|---|---|
| Tensile Strength (kg/cm$^2$) | 490 | 350 | 470 | 500 | 350 | 780 |
| Izod Impact Strength (kg · cm/cm Notched) | 15 | 2 | 25 | 7 | 5 | 3 |
| Heat Distortion Temp. (°C.) | 84 | 78 | 80 | 86 | 80 | 119 |
| Melt Flow Index* (g/10 min.) | 10 | 50 | 6 | 5 | 25 | 5 |
| State of Dispersion (on Electron Microscope) | Fine | Non-homogeneous (—20μ) | Fine | Fine | Fine | Fine |
| Peeling of Molding | None | Severe | None | None | None | None |

MMA—BD: Rubber-reinforced polymethyl methacrylate
HIPS: Rubber-reinforced impact-resistant polystyrene
HSB: Hydrogenated styrene-butadiene block copolymer
PC: Polycarbonate resin
*230° C., 10 kg load

EXAMPLE 17

Eighty parts by weight of the reaction product obtained in Example 1 and 20 parts by weight of glass fiber were mixed and the resultant mixture was introduced into a vent extruder and kneaded at 250° to 270° C. to obtain a glass fiber-reinforced resin composition in pellet form. This composition was subjected to property tests and paintability test. The paintability was evaluated by coating a molded test piece with an acrylic paint and then visually observing the appearance of the coated test piece. Adhesion test of the coated film was effected with a molded test piece which had been subjected to moisture resistance test at 50° C. and at least 98% RH for 72 hours. The results are shown in Table 9 together with the results obtained with glass fiber-reinforced polystyrene and glass fiber-reinforced nylon-6. It is recognized that the glass fiber-reinforced resin composition of the present invention had high heat resistance, good paintability and excellent mechanical properties.

TABLE 9

| Resin | | Example 17 Reaction product of Example 1 | Poly-styrene | Nylon-6 |
|---|---|---|---|---|
| Content of Glass Fiber (%) | | 20 | 20 | 20 |
| | Tensile Strength ($kg/cm^2$) | 1100 | 850 | 1200 |
| | Flexural Strength ($kg/cm^2$) | 1500 | 1000 | 1700 |
| | Flexural Modulus ($kg/cm^2$) | 62000 | 60000 | 64000 |
| | Izod Impact Strength (kg · cm/cm) | 4 | 2 | 5 |
| | Heat Distortion Temperature (°C.) | 175 | 102 | 210 |
| Paint-ability | Appearance of Coated Molded Articles | Good | Bad | Good |
| | Adhesion of Coating | Good | Good | Bad |

It should be understood throughout the specification and claims that such an expression as, for example, "a copolymer containing an imide compound of $\alpha,\beta$-unsaturated dicarboxylic acid" means a copolymer containing, as one of monomeric components, an imide compound of $\alpha,\beta$-unsaturated dicarboxylic acid.

We claim:

1. A polymeric material which comprises a novel copolymer comprising 1 to 99% by weight of a polymer chain moiety derived from a copolymer prepared from ethylenically unsaturated monomers having a molecular weight of 10,000 to 300,000 containing 1 to 30 mol % by weight of an imide compound of an $\alpha,\beta$-unsaturated dicarboxylic acid based on the weight of the copolymer and 99 to 1% by weight of a polymer chain moiety derived from a polyamide having repeating carbonamide groups on the integral part of the polymeric chain and having a molecular weight of 10,000 to 50,000, both of said chain moieties being bonded to each other, the novel copolymer having multiple phase and being prepared by grafting a polymer onto another polymer.

2. A polymeric material according to claim 1 wherein said copolymer of ethylenically unsaturated monomers is a vinyl aromatic compound copolymer, said vinyl aromatic compound copolymer comprising a vinyl aromatic compound, an imide compound of an $\alpha,\beta$-unsaturated dicarboxylic acid and a monomer copolymerizable with said vinyl aromatic compound and said imide compound in a proportion defined by the equations:

$$X/(X+Y+Z) \times 100 = 30 \text{ to } 99 \text{ mol\%} \quad (1)$$

$$Y/(X+Y+Z) \times 100 = 1 \text{ to } 30 \text{ mol\%} \quad (2)$$

$$Z/(X+Y+Z) \times 100 = 0 \text{ to } 60 \text{ mol\%} \quad (3)$$

wherein X, Y and Z are the moles of the vinyl aromatic compound, the imide compound and the monomer copolymerizable with the vinyl aromatic compound and the imide compound, respectively.

3. The polymeric material according to claim 2 wherein the monomer copolymerizable with the imide compound of $\alpha,\beta$-unsaturated dicarboxylic acid and the vinyl aromatic compound is at least one member selected from the group consisting of $\alpha,\beta$-unsaturated nitriles, $\alpha,\beta$-unsaturated carboxylic acid esters and $\alpha,\beta$-unsaturated carboxylic acids.

4. The polymeric material according to claim 2 wherein the vinyl aromatic compound copolymer contains 70 to 99mol % (based on total of monomers) of a vinyl aromatic compound and 1 to 30 mol % of an imide compound of $\alpha,\beta$-unsaturated dicarboxylic acid.

5. The polymeric material according to claim 2 wherein the vinyl aromatic compound copolymer comprises 30 to 97 mol % of a vinyl aromatic compound, 1 to 30 mol % of an imide compound of $\alpha,\beta$-unsaturated dicarboxylic acid and 2 to 60 mol % of an $\alpha,\beta$-unsaturated nitrile.

6. The polymeric material according to claim 2 wherein the vinyl aromatic compound copolymer comprises 30 to 97 mol % of a vinyl aromatic compound, 1 to 30 mol % of an imide compound of $\alpha,\beta$-unsaturated dicarboxylic acid and 2 to 50 mol % of an $\alpha,\beta$-unsaturated carboxylic acid ester.

7. The polymeric material according to claim 1 wherein the imide compound of $\alpha,\beta$-unsaturated dicarboxylic acid is N-phenylmaleinimide.

8. The polymeric material according to claim 2 wherein the polyamide is polycaprolactam.

9. The polymeric material according to claim 2 wherein the polyamide is polyhexamethylene adipamide.

10. A novel copolymer which comprises 1 to 99% by weight of a polymer chain moiety of a vinyl aromatic compound copolymer bonded to 99 to 1% by weight of a polymer chain moiety of a polyamide having repeating carbonamide groups on the integral part of the polymeric chain and having a molecular weight of 10,000 to 50,000, said vinyl aromatic compound copolymer having a molecular weight of 10,000 to 300,000 and being prepared from ethylenically unsaturated monomers comprising a vinyl aromatic compound, an imide compound of an $\alpha,\beta$-unsaturated dicarboxylic acid and a monomer copolymerizable with said vinyl aromatic compound and said imide compound in a proportion defined by the equations:

$$X/(Y+Y+Z) \times 100 = 30 \text{ to } 99 \text{ mol } \% \quad (1)$$

$$Y/(X+Y+Z) \times 100 = 1 \text{ to } 30 \text{ mol } \% \quad (2)$$

$$Z/(X+Y+Z) \times 100 = 0 \text{ to } 60 \text{ mol } \% \quad (3)$$

wherein X, Y and Z are the moles of the vinyl aromatic compound, the imide compound and the monomer copolymerizable with the vinyl aromatic compound and the imide compound, respectively; the novel copolymer having multiple phases and being prepared by grafting a polymer onto another polymer.

11. The novel copolymer according to claim 10 wherein the monomer copolymerizable with imide compound of $\alpha,\beta$-unsaturated dicarboxylic acid and vinyl aromatic compound is at least one member selected from the group consisting of $\alpha,\beta$-unsaturated nitrile, $\alpha,\beta$-unsaturated carboxylic acid ester and $\alpha,\beta$-unsaturated carboxylic acid.

12. The novel copolymer according to claim 10 wherein the polyamide is polycaprolactam.

13. The novel copolymer according to claim 10 wherein the polyamide is polyhexamethylene adipamide.

14. A method for preparing a novel copolymer having multiple phases, which comprises reacting without the addition of a catalyst under melt kneading 1 to 99% by weight of a vinyl aromatic compound copolymer with 99 to 1% by weight having repeating carbonamide groups on the integral part of the polymeric chain and having a molecular weight of 10,000 to 50,000, until the vinyl aromatic compound copolymer chain moiety is bonded to the polyamide chain moiety, said vinyl aromatic compound copolymer having a molecular weight of 10,000 to 300,000 and being prepared from ethylenically unsaturated monomers comprising 30 to 99 mol % of a vinyl aromatic compound, 1 to 30 mol % of an imide compound of α,β-unsaturated dicarboxylic acid and 0 to 60 mol % of a monomer copolymerizable with said vinyl aromatic compound and said imide compound.

15. A polymeric material according to claim 1 wherein said polymer of ethylenically unsaturated monomers is derived from an unsaturated carboxylic acid ester copolymer, said unsaturated carboxylic acid ester copolymer comprising an α,β-unsaturated carboxylic acid ester, an imide compound of an α,β-unsaturatdd dicarboxylic acid and a monomer copolymerizable with said ester and said imide compound in a proportion defined by the equation:

$$X/(X+Y+Z)\times 100 = 50 \text{ to } 99 \text{ mol \%} \quad (1)$$

$$Y/(X+Y+Z)\times 100 = 1 \text{ to } 30 \text{ mol \%} \quad (2)$$

$$Z/(X+Y+Z)\times 100 = 0 \text{ to } 49 \text{ mol \%} \quad (3)$$

wherein X, Y and Z are the moles of the ester, the imide compound and the monomer copolymerizable with the ester and the imide compound, respectively.

16. The polymeric material according to claim 15 wherein the monomer copolymerizable with α,β-unsaturated carboxylic acid ester and imide compound of α,β-dicarboxylic acid is at least one member selected from vinyl aromatic compounds, monoolefins, α,β-unsaturated nitrile and α,β-unsaturated carboxylic acids.

17. The polymeric material according to claim 15 wherein the α,β-unsaturated carboxylic acid ester is at least one selected from alkyl esters of acrylic acid and methacrylic acid.

18. The polymeric material according to claim 15 wherein the imide compound of α,β-unsaturated dicarboxylic acid is N-phenylmaleinimide.

19. The polymeric material according to claim 15 wherein the polyamide is polycaprolactum.

20. The polymeric material according to claim 15 wherein the polyamide is polyhexamethylene adipamide.

21. A novel copolymer which comprises 1 to 99% by weight of a polymer chain moiety derived from an unsaturated carboxylic acid ester copolymer and 99 to 1% by weight of a polymer chain moiety derived from a polyamide having repeating carbonamide groups on the integral part of the polymeric chain and having a molecular weight of 10,000 to 50,000, both chain moieties being bonded to each other, said unsaturated carboxylic acid ester copolymer having a molecular weight of 10,000 to 300,000 and being prepared from ethylenically unsaturated monomers comprising a vinyl aromatic compound, an imide compound of an α,β-unsaturated dicarboxylic acid and a monomer copolymerizable with said vinyl aromatic compound and said imide compound in a proportion defined by the equations:

$$X/(Y+Y+Z)\times 100 = 30 \text{ to } 99 \text{ mol \%} \quad (1)$$

$$Y/(X+Y+Z)\times 100 = 1 \text{ to } 30 \text{ mol \%} \quad (2)$$

$$Z/(X+Y+Z)\times 100 = 0 \text{ to } 60 \text{ mol \%} \quad (3)$$

wherein X, Y and Z are the moles of the vinyl aromatic compound, the imide compound and the monomer copolymerizable with the vinyl aromatic compound and the imide compound, respectively; the novel copolymer having multiple phases and being prepared by grafting a polymer onto another polymer.

22. The novel copolymer according to claim 21 wherein the monomer copolymerizable with α,β-unsaturated carboxylic acid ester and imide compound of α,β-unsaturated dicarboxylic acid is at least one member selected from vinyl aromatic compounds, monoolefins, α,β-unsaturated nitrile and α,β-unsaturated carboxylic acids.

23. The novel copolymer according to claim 21 wherein the polyamide is polycaprolactam.

24. The novel copolymer according to claim 21 wherein the polyamide is polyhexamethylene adipamide.

25. A method for preparing a novel copolymer having multiple phases which comprises bonding 99 to 1% by weight of an unsaturated carboxylic acid ester copolymer chain moiety to 1 to 99% by weight of a polyamide chain moiety having repearing carbonitrile groups on the integral part of the polymeric chain and having a molecular weight of 10,000 to 50,000, which comprises reacting under melt kneading without addition of a catalyst, said unsaturated carboxylic acid ester copolymer and said polyamide, said unsaturated carboxylic acid ester copolymer having a molecular weight of 10,000 to 300,000 and being prepared from ethylenically unsaturated monomers comprising 50 to 99 mole % of an α,β-unsaturated carboxylic acid ester, 1 to 30 mole % of an imide compound of α,β-unsaturated dicarboxylic acid and 0 to 49 mole % of a monomer copolymerizable with said ester and said imide compound.

26. A novel thermoplastic resin composition which comprises (1) a novel copolymer comprising 99 to 1% by weight of a polymer chain moiety derived from a copolymer prepared from ethylenically unsaturated monomers having a molecular weight of 10,000 to 300,000 containing 1 to 30 mol % of an imide compound of an α,β-unsaturated dicarboxylic acid and 1 to 99% by weight of a polymer chain moiety derived from a polyamide having repeating carbonamide groups on the integral part of the polymeric chain and having a molecular weight of 10,000 to 50,000 both polymer chain moieties being bonded to each other, the novel copolymer having multiple phases and being prepared by grafting a polymer onto another polymer, and (2) a thermoplastic resin.

27. The resin composition according to claim 26 wherein said copolymer prepared from ethylenically unsaturated monomers is a vinyl aromatic compound copolymer containing said imide compound of α,β-unsaturated dicarboxylic acid and a vinyl aromatic compound.

28. The resin composition according to claim 27 wherein the vinyl aromatic compound copolymer comprises 30 to 99 mol % of a vinyl aromatic compound, 1 to 30 mol % of an imide compound of α,β-unsaturated dicarboxylic acid and 0 to 60 mol % of a monomer copolymerizable with said vinyl aromatic compound and said imide compound of α,β-unsaturated dicarboxylic acid.

29. The resin composition according to claim 28 wherein the monomer copolymerizable with imide compound of α,β-unsaturated dicarboxylic acid and vinyl aromatic compound is at least one member selected from the group consisting of α,β-unsaturated nitriles, α,β-unsaturated carboxylic acid esters and α,β-unsaturated carboxylic acids.

30. The resin composition according to claim 28 wherein the vinyl aromatic compound copolymer comprises 70 to 99 mol % of a vinyl aromatic compound and 1 to 30 mol % of an imide compound of α,β-unsaturated dicarboxylic acid.

31. The resin composition according to claim 28 wherein the vinyl aromatic compound copolymer comprises 30 to 97 mol % of a vinyl aromatic compound, 1 to 30 mol % of an imide compound of α,β-unsaturated dicarboxylic acid and 2 to 60 mol % of an α,β-unsaturated nitrile.

32. The resin composition according to claim 28 wherein the vinyl aromatic compound copolymer comprises 30 to 97 mol % of a vinyl aromatic compound, 1 to 30 mol % of an imide compound of α,β-unsaturated dicarboxylic acid and 2 to 50 mol % of an α,β-unsaturated carboxylic acid ester.

33. The resin composition according to claim 26 wherein the imide compound of α,β-unsaturated dicarboxylic acid is N-phenylmaleinimide.

34. The resin composition according to claim 26 wherein the thermoplastic resin is resin of a vinyl aromatic compound.

35. The resin composition according to claim 34 wherein the vinyl aromatic compound resin is a polystyrene or rubber-reinforced impact resistant polystyrene.

36. The resin composition according to claim 35 wherein the vinyl aromatic compound copolymer containing an imide compound of α,β-unsaturated dicarboxylic acid comprises 70 to 99 mol % of a vinyl aromatic compound and 1 to 30 mol % of N-phenylmaleinimide.

37. The resin composition according to claim 34 wherein the vinyl aromatic compound resin is selected from AS resin (styrene-acrylonitrile copolymer resin), ABS resin (styrene-acrylonitrile-butadiene copolymer resin), AES resin (ethylene-propylene rubber-reinforced styrene-acrylonitrile copolymer resin) and AAS resin (polyacrylic ester rubber-reinforced styrene-acrylonitrile copolymer resin).

38. The resin composition according to claim 37 wherein the vinyl aromatic compound copolymer containing an imide compound of α,β-unsaturated dicarboxylic acid comprises 30 to 97 mol % of a vinyl aromatic compound, 1 to 30 mol % of an imide compound of α,β-unsaturated dicarboxylic acid and 2 to 60 mol % of an α,β-unsaturated nitrile.

39. The resin composition according to claim 37 wherein the vinyl aromatic compound copolymer containing an imide compound of α,β-unsaturated dicarboxylic acid comprises 30 to 97 mol % of a vinyl aromatic compound, 1 to 30 mol % of an imide compound of α,β-unsaturated dicarboxylic acid and 2 to 50 mol % of an α,β-unsaturated carboxylic acid ester.

40. The resin composition according to claim 34 wherein the vinyl aromatic compound resin is MS resin (styrene-methyl methacrylate copolymer resin) or MBS resin (styrene-methyl methacrylate-butadiene copolymer resin).

41. The resin composition according to claim 40 wherein the vinyl aromatic compound copolymer containing an imide compound of α,β-unsaturated dicarboxylic acid comprises 30 to 97 mol % of a vinyl aromatic compound, 1 to 30 mol % of an imide compound of α,β-unsaturated dicarboxylic acid and 2 to 50 mol % of an α,β-unsaturated carboxylic acid ester.

42. The resin composition according to claim 40 wherein the vinyl aromatic compound copolymer containing an imide compound of α,β-unsaturated dicarboxylic acid comprises 30 to 97 mol % of a vinyl aromatic compound, 1 to 30 mol % of an imide compound of α,β-unsaturated dicarboxylic acid and 2 to 60 mol % of an α,β-unsaturated nitrile.

43. The resin composition according to claim 26 wherein said polymer prepared from ethylenically unsaturated monomers is an unsaturated carboxylic acid ester copolymer containing an imide compound of α,β-unsaturated dicarboxylic acid and an α,β-unsaturated carboxylic acid ester.

44. The resin composition according to claim 43 wherein the unsaturated carboxylic acid ester copolymer comprises 50 to 99 mol % of an α,β-unsaturated carboxylic acid ester, 1 to 30 mol % of an imide compound of α,β-unsaturated dicarboxylic acid and 0 to 49 mol % of a monomer copolymerizable with the α,β-unsaturated carboxylic acid ester and the imide compound of α,β-unsaturated dicarboxylic acid.

45. The resin composition according to claim 44 wherein the monomer copolymerizable with α,β-unsaturated carboxylic acid ester and imide compound of α,β-unsaturated dicarboxylic acid is at least one member selected from vinyl aromatic compounds, monoolefins, α,β-unsaturated nitriles and α,β-unsaturated carboxylic acids.

46. The resin composition according to claim 26 wherein the imide compound of α,β-unsaturated dicarboxylic acid is N-phenylmaleinimide.

47. The resin composition according to claim 43 wherein the thermoplastic resin is polymethyl methacrylate or rubber-reinforced polymethyl methacrylate copolymer resin.

48. The resin composition according to claim 43 wherein the thermoplastic resin is MS resin (styrene-methyl methacrylate copolymer resin) or MBS resin (styrene-methyl methacrylate-butadiene copolymer resin).

49. The resin composition according to claim 43 wherein the thermoplastic resin is selected from AS resin (styrene-acrylonitrile copolymer resin), ABS resin (styrene-acrylonitrile-butadiene copolymer resin), AES resin (ethylenepropylene rubber-reinforced styrene-acrylonitrile copolymer resin) and AAS resin (polyacrylic ester rubber-reinforced styrene-acrylonitrile copolymer resin).

50. The resin composition according to claim 26, wherein the polyamide is polycaprolactam.

51. The resin composition according to claim 26, wherein the polyamide is polyhexamethylene adipamide.

52. The resin composition according to claim 26 wherein the thermoplastic resin is a polycarbonate resin.

53. The resin composition according to claim 52 wherein the copolymer containing an imide compound of α,β-unsaturated dicarboxylic acid comprises 1 to 30 mole % of the imide compound of α,β-unsaturated dicarboxylic acid, 30 to 89 mole % of a vinyl aromatic compound and 10 to 50 mole % of an α,β-unsaturated nitrile.

54. The resin composition according to claim 52 wherein the copolymer containing an imide compound of α,β-unsaturated dicarboxylic acid comprises 1 to 30 mole % of the imide compound of α,β-unsaturated dicarboxylic acid, 10 to 90 mole % of an α,β-unsaturated carboxylic acid ester and 0 to 89 mole % of a vinyl aromatic compound.

55. The resin composition according to claim 26 wherein the thermoplastic resin is a polysulfone resin or a polyarylate resin.

56. The resin composition according to claim 26 wherein the thermoplastic resin is at least one elastomer selected from ethylene-butadiene block copolymer elastomers, hydrogenated styrene-butadiene block copolymer elastomers and thermoplastic polyester elastomers.

57. The resin composition according to claim 26 wherein the thermoplastic resin is polyamide.

58. A glass fiber-reinforced resin composition which comprises 40 to 95% by weight of the polymeric material according to claim 1 and 5 to 60% by weight of glass fiber.

59. A glass fiber-reinforced resin composition which comprises 40 to 95% by weight of the resin composition according to claim 28 and 5 to 60% by weight of glass fiber.

* * * * *